United States Patent
McLaury et al.

(10) Patent No.: US 12,512,143 B2
(45) Date of Patent: Dec. 30, 2025

(54) DUAL POWER SUPPLIED MEMORY CELLS AND DETERMINISTIC RESET THEREOF FOR PROGRAMMABLE LOGIC DEVICES

(71) Applicant: Lattice Semiconductor Corporation, Hillsboro, OR (US)

(72) Inventors: Loren L. McLaury, Hillsboro, OR (US); Bradley A. Sharpe-Geisler, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 216 days.

(21) Appl. No.: 18/525,216

(22) Filed: Nov. 30, 2023

(65) Prior Publication Data

US 2024/0185908 A1  Jun. 6, 2024

Related U.S. Application Data

(60) Provisional application No. 63/429,758, filed on Dec. 2, 2022.

(51) Int. Cl.
| | | |
|---|---|---|
| *G11C 11/40* | (2006.01) | |
| *G11C 11/4072* | (2006.01) | |
| *G11C 11/4074* | (2006.01) | |
| *G11C 11/4096* | (2006.01) | |

(52) U.S. Cl.
CPC ...... *G11C 11/4074* (2013.01); *G11C 11/4072* (2013.01); *G11C 11/4096* (2013.01)

(58) Field of Classification Search
CPC ............ G11C 11/4074; G11C 11/4072; G11C 11/4096; G11C 11/417; G11C 11/412
See application file for complete search history.

(56) References Cited

U.S. PATENT DOCUMENTS

| | | |
|---|---|---|
| 9,286,952 B2 | 3/2016 | McLaury |
| 10,417,078 B2 | 9/2019 | McLaury et al. |
| 10,783,954 B2 * | 9/2020 | Wu ........................ G11C 11/419 |

* cited by examiner

*Primary Examiner* — Xiaochun L Chen
(74) *Attorney, Agent, or Firm* — Haynes and Boone, LLP

(57) ABSTRACT

Various techniques are provided to implement dual power supplied memory cells and deterministic reset thereof for programmable logic devices. In one example, a programmable logic device (PLD) includes a configuration memory including an array of memory cells arranged in rows and columns. The PLD further includes a power supply circuit coupled to the configuration memory and configured to selectively couple, based on a reset control signal, a power supply to a first power supply line coupled to the array of memory cells. The array of memory cells is reset if the power supply is coupled to the first power supply line. The power supply circuit is further configured to provide power on a second power supply line to the array of memory cells. Related methods and devices are provided.

20 Claims, 10 Drawing Sheets

DUAL POWER SUPPLIED MEMORY CELLS AND DETERMINISTIC RESET THEREOF FOR PROGRAMMABLE LOGIC DEVICES

CROSS REFERENCE TO RELATED APPLICATIONS

This patent application claims priority to and the benefit of U.S. Provisional Patent Application No. 63/429,758, filed Dec. 2, 2022 and entitled "DUAL POWER SUPPLIED MEMORY CELLS AND DETERMINISTIC RESET THEREOF FOR PROGRAMMABLE LOGIC DEVICES," which is incorporated herein by reference in its entirety.

TECHNICAL FIELD

The present invention relates generally to programmable logic devices and, more particularly, to dual power supplied memory cells and deterministic reset thereof for programmable logic devices.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, the user designs are synthesized and mapped into configurable resources, including by way of non-limiting example programmable logic gates, look-up tables (LUTs), embedded hardware, interconnections, and/or other types of resources, available in particular PLDs. Physical placement and routing for the synthesized and mapped user designs may then be determined to generate configuration data for the particular PLDs. The generated configuration data is loaded into configuration memory of the PLDs to implement the programmable logic gates, LUTs, embedded hardware, interconnections, and/or other types of configurable resources.

SUMMARY

In one embodiment, a PLD includes a configuration memory including an array of memory cells arranged in rows and columns. The PLD further includes a power supply circuit coupled to the configuration memory and configured to selectively couple, based on a reset control signal, a power supply to a first power supply line coupled to the array of memory cells. The array of memory cells is reset if the power supply is coupled to the first power supply line. The power supply circuit is further configured to provide power on a second power supply line to the array of memory cells.

In another embodiment, a method includes selectively coupling, by a power supply circuit based on a reset control signal, a power supply to a first power supply line coupled to an array of memory cells. The power supply circuit is coupled to a configuration memory including the array of memory cells arranged in rows and columns. The array of memory cells is reset if the power supply is coupled to the first power supply line. The method further includes providing, by the power supply circuit, power on a second power supply line to the array of memory cells.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
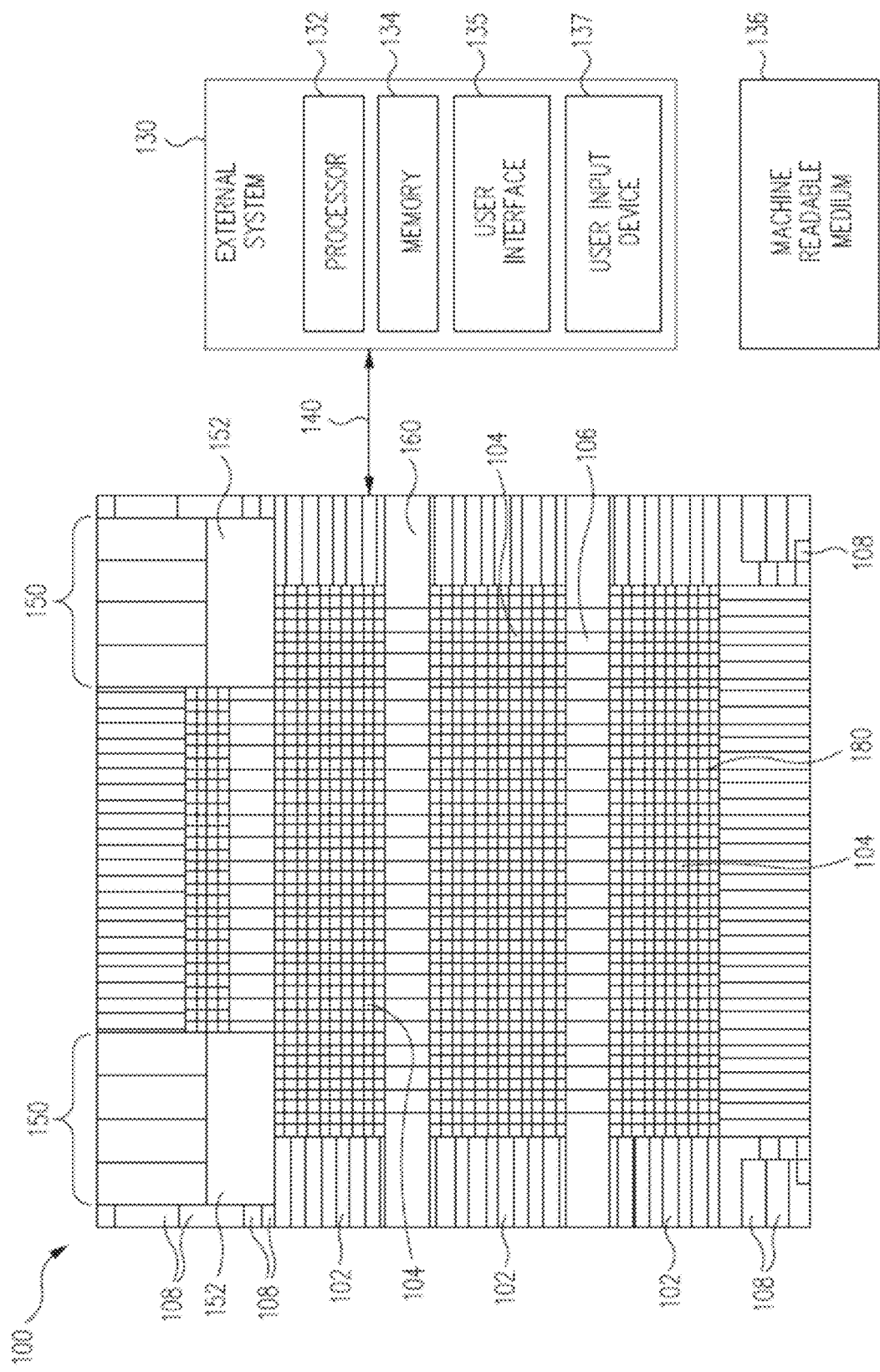
FIG. 1 illustrates a block diagram of a PLD in accordance with one or more embodiments of the present disclosure.

In accordance with embodiments disclosed herein, various techniques are provided to implement dual power supplied memory cells and deterministic reset thereof for programmable logic devices. PLDs, such as FPGAs, include configuration memory cells used to control functions desired from PLD logic. The PLDs may include an array of the configuration memory cells arranged in rows and columns and usable to store configuration data. Although the present disclosure generally refers to various operations performed on rows and/or columns, rows may be used as columns and columns may be used as rows as appropriate. The configuration memory cells may be volatile memory cells, such as random access memory (RAM) cells. In such cases, the configuration memory cells may be referred to as configuration random access memory (CRAM) cells. The CRAM cells may be static RAM (SRAM) cells. The configuration memory cells may be used to implement the PLD's programmable logic cells (PLCs), embedded block RAM (EBR) blocks, digital signal processing (DSP) blocks, etc. In the PLCs, the configuration memory cells may implement LUTs, input switch box (ISB)/output switch box (OSB) routing selection, and other associated logic functions.

During a power up of a PLD, the configuration memory cells need to initialize (e.g., also referred to as wake up) to states that do not cause contention in routing resources (e.g., routing multiplexers) and other associated logic. An initialized memory cell may refer to a memory cell driven to a reset state (e.g., also referred to as an erased state). In an embodiment, the initialized memory cell (e.g., the memory cell in the reset state) may be required to store and output data indicative of a 0. In an aspect, a power up event may also be referred to as a power-on event or a power-on-reset (POR) event.

After the configuration memory cells are loaded with configuration data, a reprogramming event may be performed to load new configuration data into the configuration memory cells. The configuration memory cells are erased (e.g., set to the reset state) before they can be reprogrammed with a new bitstream containing the new configuration data in order to avoid contentious bit patterns in the PLD fabric. In an aspect, the reprogramming event may be considered as including an erase event in which the configuration memory cells are erased prior to reprogramming or as being a separate event that follows the erase event.

In some embodiments, to facilitate deterministic reset of the configuration memory cells of the PLD, each of the configuration memory cells are powered using two separate power supply lines. In an aspect, the power supply lines may be referred to as and/or considered to be power supply nodes, power supply sources, and power supplies. The power supplies may be actuated in a manner to allow the configuration memory cell to wake up in a pre-determined state (e.g., a reset state) when the PLD is powered up. In some cases, after power up, the configuration memory cells may be set to this pre-determined state in preparation for reprogramming (e.g., also referred to as reconfiguring). In some cases, the PLD may be sector erased. In some aspects, a first power supply line and/or a second power supply line coupled to the configuration memory cells may be selectively coupled to a source power supply $V_{CC}$. During a reset of the PLD, whether as part of a POR event or prior to a reprogramming event, the first power supply line may be decoupled from the source power supply $V_{CC}$ to drive the configuration memory cells to the reset state. In some cases, during the reset, bitlines may be driven to complementary levels to help instantiation of the reset state of the configuration memory cells. In an aspect, each configuration memory cell may include an SRAM cell, with the power supply lines supplying power to inverters of the SRAM cell.

Thus, using various embodiments, the configuration memory cells of the PLD are placed in a known reset state (e.g., an allowed safe state of the PLD), rather than placed in one of many possible illegal states for groups of configuration memory cells that may exhibit undesired behavior. The configuration memory cells may be set to the known reset state while allowing for operation with various power supply ramp rates and without contention (e.g., current contention) in the programmable logic during the power up and reprogramming events.

Referring now to the figures, FIG. 1 illustrates a block diagram of a PLD 100 in accordance with one or more embodiments of the present disclosure. The PLD 100 (e.g., an FPGA, a CPLD, an FPSC, or other type of programmable device) generally includes I/O blocks 102 and programmable logic blocks (PLBs) 104. In some cases, the PLD 100 may generally be any type of programmable device (e.g., programmable integrated circuit) with distributed configuration, which may involve loading configuration data through pins, shifting to appropriate locations in associated fabric, and configuring configuration memory cells. The PLBs may also be referred to as logic blocks, programmable functional units (PFUs), or PLCs. In an aspect, the PLBs 104 may collectively form an integrated circuit (IC) core or logic core of the PLD 100. The I/O blocks 102 provide I/O functionality (e.g., to support one or more I/O and/or memory interface standards) for the PLD 100, while the PLBs 104 provide logic functionality (e.g., LUT-based logic) for the PLD 100. Additional I/O functionality may be provided by serializer/deserializer (SERDES) blocks 150 and physical coding sublayer (PCS) blocks 152. The PLD 100 may also include hard intellectual property core (IP) blocks 160 to provide additional functionality (e.g., substantially predetermined functionality provided in hardware which may be configured with less programming than the PLBs 104).

The PLD 100 may include blocks of memory 106 (e.g., blocks of erasable programmable read-only memory (EEPROM), block static RAM (SRAM), and/or flash memory), clock-related circuitry 108 (e.g., clock sources, phase-locked loop (PLL) circuits, and/or delay-locked loop (DLL) circuits), and/or various routing resources 180 (e.g., interconnect and appropriate switching circuits to provide paths for routing signals throughout the PLD 100, such as for clock signals, data signals, control signals, wakeup signals, or others) as appropriate. The PLD 100 may include configuration and activation logic to receive configuration data, configure various programmable elements of the PLD 100, and activate functionality associated with these programmable elements. In general, the various elements of the PLD 100 may be used to perform their intended functions for desired applications, as would be understood by one skilled in the art.

For example, certain of the I/O blocks 102 may be used for programming the memory 106 or transferring information (e.g., various types of user data and/or control signals) to/from the PLD 100. Other of the I/O blocks 102 include a first programming port (which may represent a central processing unit (CPU) port, a peripheral data port, a serial peripheral interface (SPI) interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, the I/O blocks 102 may be included to receive configuration data and commands (e.g., over one or more connections) to configure the PLD 100 for its intended use and to support serial or parallel device configuration and information transfer with the SERDES blocks 150, PCS blocks 152, hard IP blocks 160, and/or PLBs 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout the PLD 100, such as in and between the PLBs 104, hard IP blocks 160, and routing resources 180 to perform their conventional functions (e.g., storing configuration data that configures the PLD 100 or providing interconnect structure within the PLD 100). For example, the routing resources 180 may be used for internal connections within each PLB 104 and/or between different PLBs 104. It should also be understood that the various embodiments disclosed herein are not limited to programmable logic devices, such as the PLD 100, and may be applied to various other types of programmable devices, as would be understood by one skilled in the art.

An external system 130 may be used to create a desired user configuration or design of the PLD 100 and generate corresponding configuration data to program (e.g., configure) the PLD 100. For example, to configure the PLD 100, the system 130 may provide such configuration data to one or more of the I/O blocks 102, PLBs 104, SERDES blocks 150, and/or other portions of the PLD 100. In this regard, the external system 130 may include a link 140 that connects to a programming port (e.g., SPI, JTAG) of the PLD 100 to facilitate transfer of the configuration data from the external system 130 to the PLD 100. As a result, the I/O blocks 102, PLBs 104, various of the routing resources 180, and any other appropriate components of the PLD 100 may be configured to operate in accordance with user-specified applications.

In the illustrated embodiment, the system 130 is implemented as a computer system. In this regard, the system 130 includes, for example, one or more processors 132 that may be configured to execute instructions, such as software instructions, provided in one or more memories 134 and/or stored in non-transitory form in one or more non-transitory machine readable media 136 (e.g., which may be internal or external to the system 130). For example, in some embodiments, the system 130 may run PLD configuration software, such as Lattice Diamond System Planner software available from Lattice Semiconductor Corporation to permit a user to create a desired configuration and generate corresponding configuration data to program the PLD 100.

In some embodiments, the memory 106 of the PLD 100 may include non-volatile memory (e.g., flash memory) utilized to store the configuration data generated and provided to the memory 106 by the external system 130. During configuration of the PLD 100, the non-volatile memory may provide the configuration data via configuration paths and associated data lines to configure the various portions (e.g., I/O blocks 102, PLBs 104, SERDES blocks 150, routing resources 180, and/or other portions) of the PLD 100. In some cases, the configuration data may be stored in non-volatile memory external to the PLD 100 (e.g., on an external hard drive such as the memories 134 in the system 130). During configuration, the configuration data may be provided (e.g., loaded) from the external non-volatile memory into the PLD 100 to configure the PLD 100.

The system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of the PLD 100.

Figure 2:
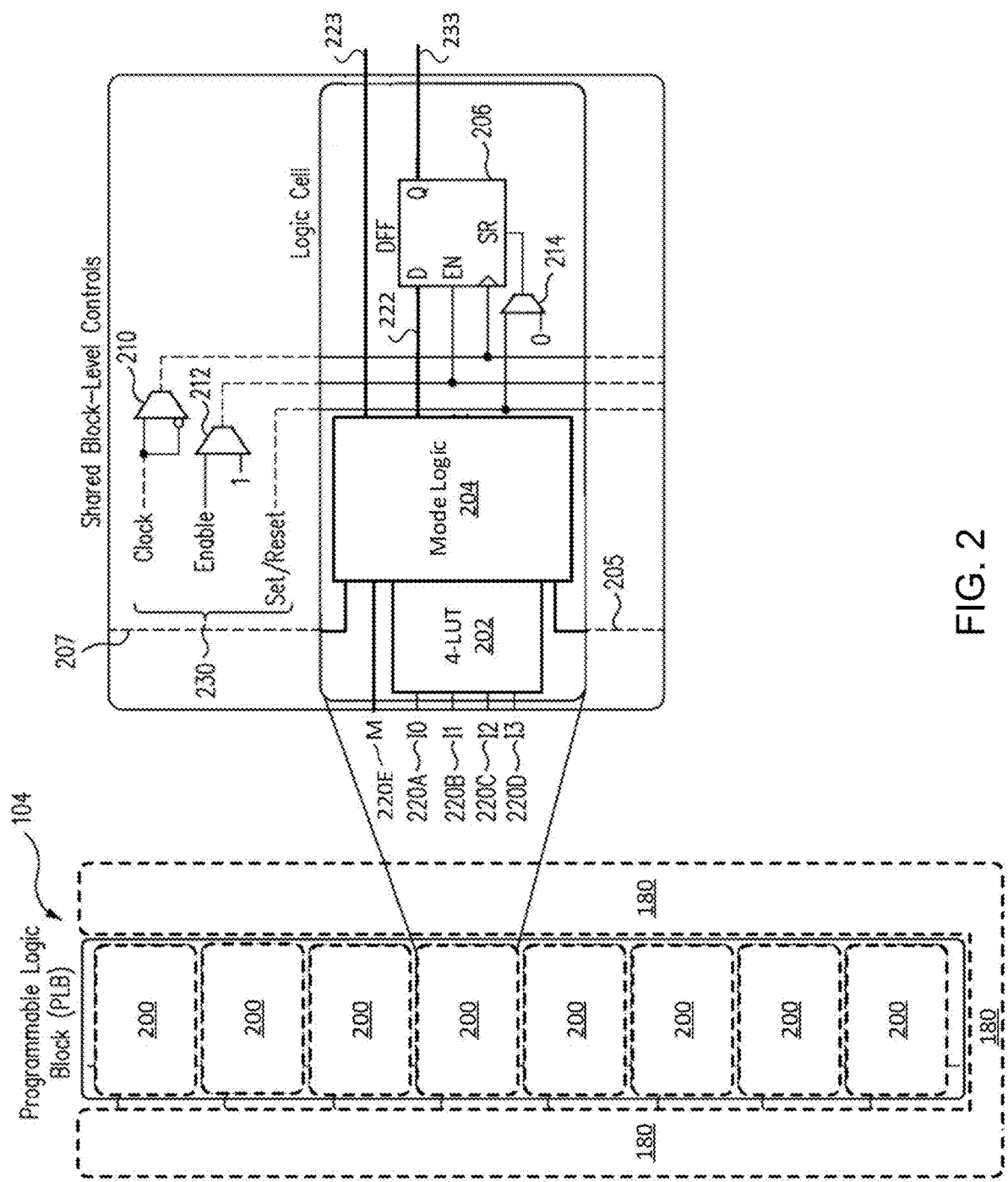
FIG. 2 illustrates a block diagram of a programmable logic block of a PLD in accordance with one or more embodiments of the present disclosure.

FIG. 2 illustrates a block diagram of a programmable logic block 104 of PLD 100 in accordance with one or more embodiments of the present disclosure. The programmable logic block 104 includes programmable logic cells (PLCs) 200. In some cases, the PLCs 200 include various components to provide logic and arithmetic functionality. The PLCs 200 may be interconnected internally within the programmable logic block 104 and/or externally (e.g., to PLCs of other programmable logic blocks) using the routing resources 180. Each PLC 200 may provide logic functions defined/configured by corresponding memory cells of the programmable logic block 104. As one example shown in FIG. 2, one of the PLCs 200 may be implemented as a LUT 202, a mode logic circuit 204, a register 206 (e.g., a flip-flop or latch), and various programmable multiplexers (e.g., programmable multiplexers 212 and 214) for selecting desired signal paths for logic cell 200 and/or between logic cells 200.

In this example, the LUT 202 accepts four inputs $I_0$, $I_1$, $I_2$, and $I_3$, and generates an output signal based at least on the four inputs. Since the LUT 202 accepts four inputs, the LUT 202 is a four-input LUT (which may be abbreviated as "4-LUT" or "LUT4"). The LUT 202 can be programmed by configuration data for the PLD 100 to implement any appropriate logic operation having four inputs or less. The LUT 202 in other examples may be of any other suitable size having any other suitable number of inputs for a particular implementation of a PLD. In some embodiments, different size LUTs may be provided for different programmable logic blocks 104 and/or different PLCs 200.

An output signal 222 from the LUT 202 and/or the mode logic 204 may in some embodiments be passed through the register 206 to provide an output signal 233 of the logic cell 200. In some embodiments, an output signal 223 from the LUT 202 and/or the mode logic 204 may be passed to the output 223 directly, as shown. Depending on the configuration of the multiplexers 210-214 and/or the mode logic 204, the output signal 222 may be temporarily stored (e.g., latched) in the latch 206 according to control signals 230. In some embodiments, configuration data for the PLD 100 may configure the output 223 and/or 233 of the logic cell 200 to be provided as one or more inputs of another logic cell 200 (e.g., in another logic lock or the same logic block) in a staged or cascaded arrangement (e.g., including multiple levels) to configure logic operations that cannot be implemented in a single logic cell 200 (e.g., logic operations that have too many inputs to be implemented by a single LUT 202). Moreover, the logic cells 200 may be implemented with multiple outputs and/or interconnections to facilitate selectable modes of operation.

The mode logic circuit 204 may be utilized for some configurations of the PLD 100 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation. In this regard, the mode logic circuits 204, across multiple logic cells 202, may be chained together to pass carry-in signals 205 and carry-out signals 207, and/or other signals (e.g., output signals 222) between adjacent logic cells 200. In the example of FIG. 2, the carry-in signal 205 may be passed directly to the mode logic circuit 204, for example, or may be passed to the mode logic circuit 204 by configuring one or more programmable multiplexers. In some embodiments, the mode logic circuits 204 may be chained across multiple logic blocks 104.

The logic cell 200 illustrated in FIG. 2 is merely an example, and logic cells 200 according to different embodiments may include different combinations and arrangements of PLD components. Also, although FIG. 2 illustrates the logic block 104 having eight logic cells 200, the logic block 104 according to other embodiments may include fewer logic cells 200 or more logic cells 200. Each of the logic cells 200 of the logic block 104 may be used to implement a portion of a user design implemented by the PLD 100. In this regard, the PLD 100 may include many logic blocks 104, each of which may include logic cells 200 and/or other components which are used to collectively implement the user design.

Portions of a user design may be adjusted to occupy fewer logic cells 200, fewer logic blocks 104, and/or with less burden on routing resources 180 when the PLD 100 is configured to implement the user design. Such adjustments according to various embodiments may identify certain logic, arithmetic, and/or extended logic operations, to be implemented in an arrangement occupying multiple embodiments of logic cells and/or logic blocks 104. As further described herein, the optimization process may route various signal connections associated with the arithmetic/logic operations described herein, such that a logic, ripple arithmetic, or extended logic operation may be implemented into one or more logic cells 200 and/or logic blocks 104 to be associated with the preceding arithmetic/logic operations.

Upon configuring PLD 100 with this configuration data, the LUT memory of the LUTs 202 is usable for storing LUT data to implement one or more of the LUTs 202. Once the LUT memory is configured (e.g., programmed, loaded with LUT data), the LUT memory is essentially read-only memory. In some embodiments, each programmable logic block 104 of the PLD 100 has eight LUTs 202. In some embodiments, each LUT 202 includes 16 memory cells, which may be used for configuration data.

Figure 3:
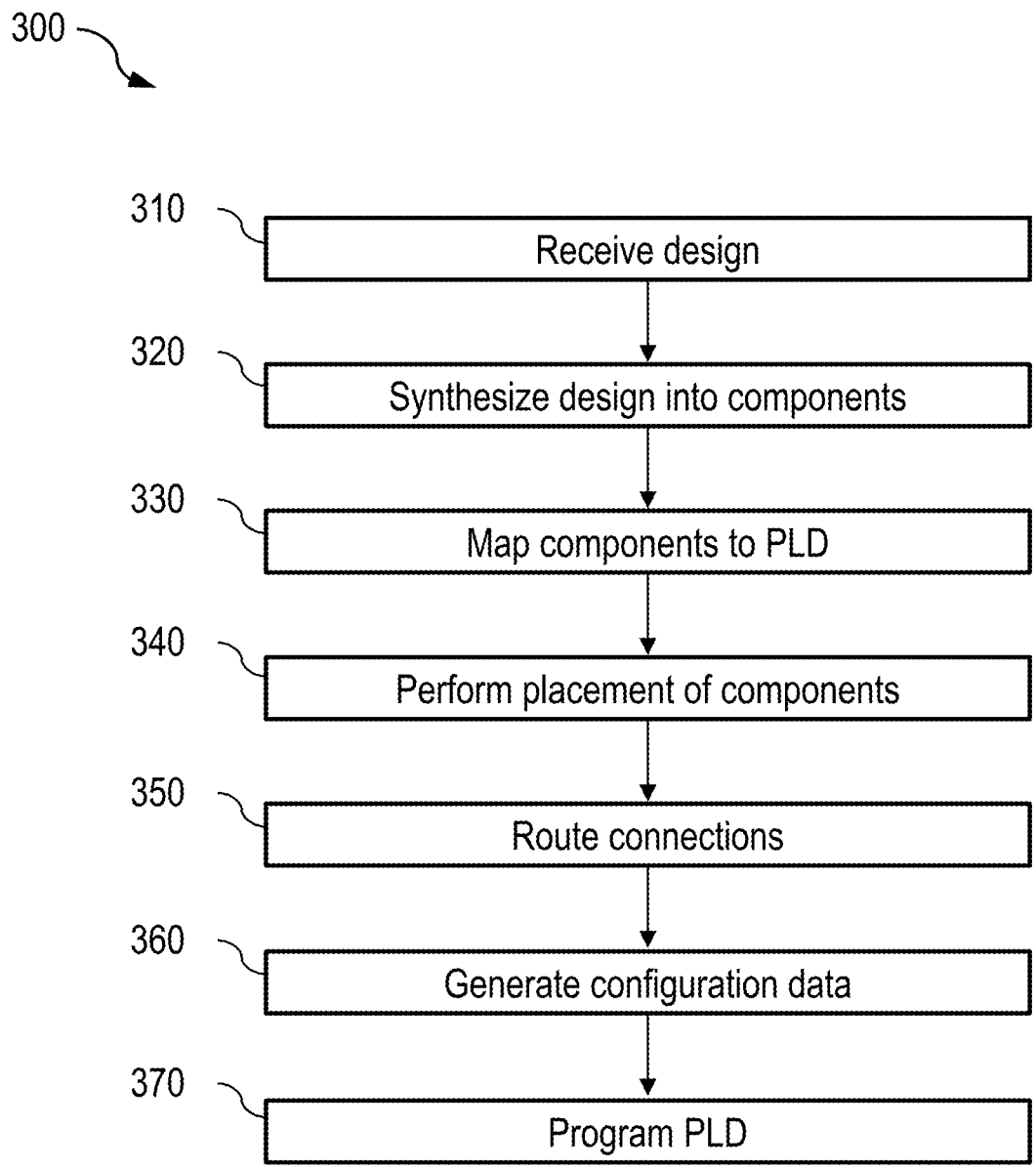
FIG. 3 illustrates a design process for a PLD in accordance with one or more embodiments of the present disclosure.

FIG. 3 illustrates a design process 300 for a PLD in accordance with one or more embodiments of the present disclosure. For example, the process of FIG. 3 may be performed by the system 130 running Lattice Diamond software to configure the PLD 100. In some embodiments, the various files and information referenced in FIG. 3 may be stored, for example, in one or more databases and/or other data structures in the memory 134, the machine readable medium 136, and/or other storage.

In operation 310, the system 130 receives a user design that specifies the desired functionality of the PLD 100. For example, the user may interact with the system 130 (e.g., through the user input device 137 and hardware description language (HDL) code representing the design) to identify various features of the user design (e.g., high level logic operations, hardware configurations, I/O and/or SERDES operations, and/or other features). In some embodiments, the user design may be provided in a register transfer level (RTL) description (e.g., a gate level description). The system 130 may perform one or more rule checks to confirm that the user design describes a valid configuration of PLD 100. For example, the system 130 may reject invalid configurations and/or request the user to provide new design information as appropriate.

In operation 320, the system 130 synthesizes the design to create a netlist (e.g., a synthesized RTL description) identifying an abstract logic implementation of the user design as a plurality of logic components (e.g., also referred to as netlist components). In some embodiments, the netlist may be stored in Electronic Design Interchange Format (EDIF) in a Native Generic Database (NGD) file.

In some embodiments, synthesizing the design into a netlist in operation 320 may involve converting (e.g., translating) the high-level description of logic operations, hardware configurations, and/or other features in the user design into a set of PLD components (e.g., logic blocks 104, logic cells 200, and other components of the PLD 100 configured for logic, arithmetic, or other hardware functions to implement the user design) and their associated interconnections or signals. Depending on embodiments, the converted user design may be represented as a netlist.

In some embodiments, synthesizing the design into a netlist in operation 320 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing routing connections identified in a user design. For example, the optimization process may include detecting connections with timing errors in the user design, and interchanging and/or adjusting PLD resources implementing the invalid connections and/or other connections to reduce the number of PLD components and/or routing resources used to implement the connections and/or to reduce the propagation delay associated with the connections. In some cases, wiring distances may be determined based on timing.

In operation 330, the system 130 performs a mapping process that identifies components of the PLD 100 that may be used to implement the user design. In this regard, the system 130 may map the optimized netlist (e.g., stored in operation 320 as a result of the optimization process) to various types of components provided by the PLD 100 (e.g., logic blocks 104, logic cells 200, embedded hardware, and/or other portions of the PLD 100) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 320 to produce a netlist that is mapped to PLD components.

In operation 340, the system 130 performs a placement process to assign the mapped netlist components to particular physical components residing at specific physical locations of the PLD 100 (e.g., assigned to particular logic cells 200, logic blocks 104, clock-related circuitry 108, routing resources 180, and/or other physical components of PLD 100), and thus determine a layout for the PLD 100. In some embodiments, the placement may be performed in memory on data retrieved from one or more previously-stored NCD files, for example, and/or on one or more previously-stored NCD files, with the placement results stored (e.g., in the memory 134 and/or the machine readable medium 136) as another physical design file.

In operation 350, the system 130 performs a routing process to route connections (e.g., using the routing resources 180) among the components of the PLD 100 based on the placement layout determined in operation 340 to realize the physical interconnections among the placed components. In some embodiments, the routing may be performed in memory on data retrieved from one or more previously-stored NCD files, for example, and/or on one or more previously-stored NCD files, with the routing results stored (e.g., in the memory 134 and/or the machine readable medium 136) as another physical design file.

In various embodiments, routing the connections in operation 350 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

Changes in the routing may be propagated back to prior operations, such as synthesis, mapping, and/or placement, to further optimize various aspects of the user design.

Thus, following operation 350, one or more physical design files may be provided which specify the user design after it has been synthesized (e.g., converted and optimized), mapped, placed, and routed (e.g., further optimized) for the PLD 100 (e.g., by combining the results of the corresponding previous operations). In operation 360, the system 130 generates configuration data for the synthesized, mapped, placed, and routed user design. In various embodiments, such configuration data may be encrypted and/or otherwise secured as part of such generation process. In operation 370, the system 130 configures/programs the PLD 100 with the configuration data (e.g., a configuration) into the PLD 100 over the connection 140. Such configuration may be provided in an encrypted, signed, or unsecured/unauthenticated form dependent on application/requirements.

Figure 4:
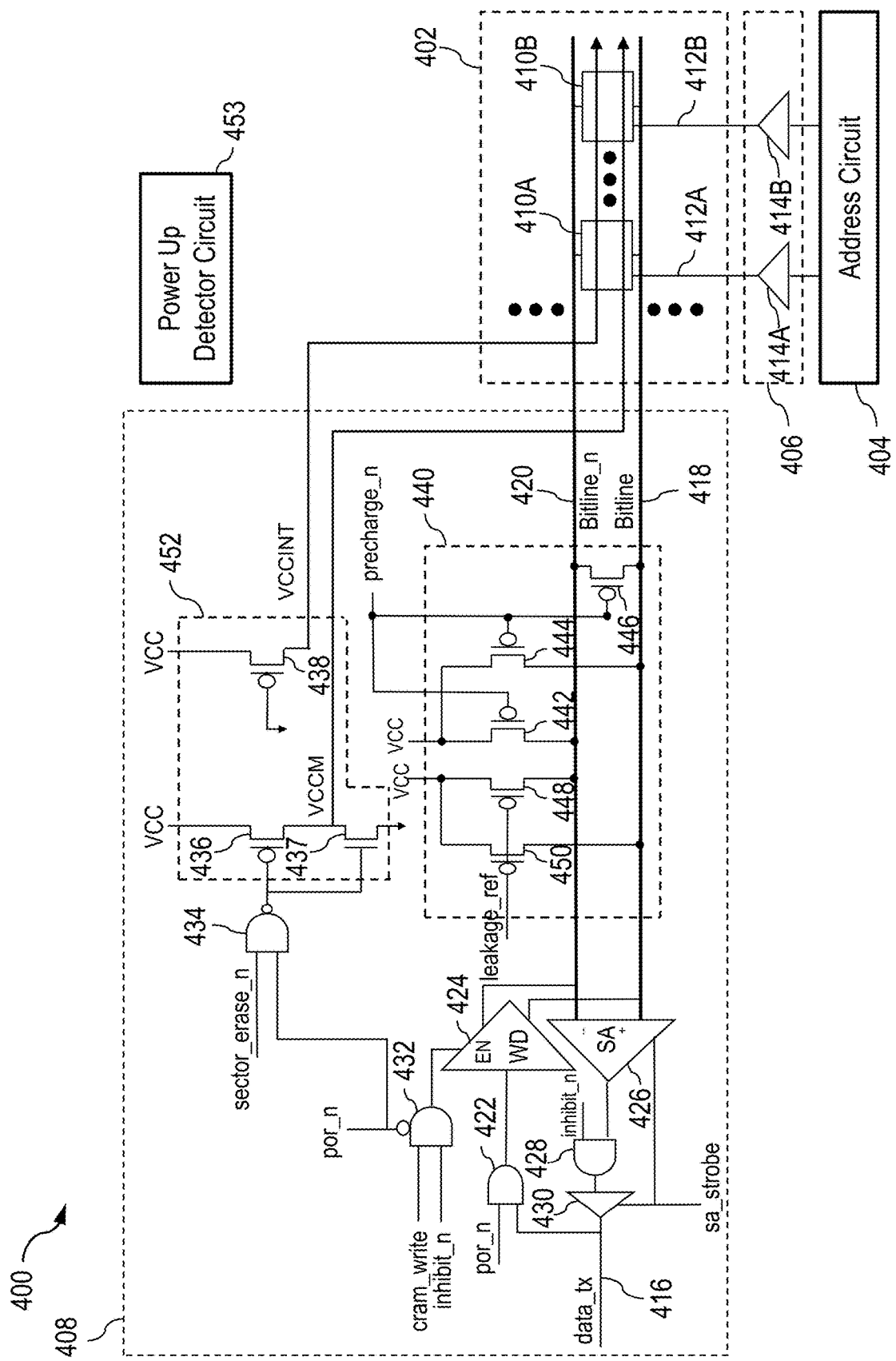
FIG. 4 illustrates a schematic diagram of a portion of a PLD with dual powered supplied memory cells for facilitating reset thereof in accordance with one or more embodiments of the present disclosure.

FIG. 4 illustrates a schematic diagram of a portion of a PLD 400 with dual powered supplied memory cells for facilitating reset thereof in accordance with one or more embodiments of the present disclosure. In an embodiment, the PLD 400 may be, may include, or may be a part of, the PLD 100 of FIG. 1. The PLD 400 includes a memory cell array 402 (e.g., configuration memory cell array), an address circuit 404, a word line circuit 406, and a repeater circuit 408. The array 402 includes memory cells arranged in columns and rows and associated with a programmable logic block (e.g., the programmable logic block 104). In FIG. 4, memory cells 410A and 410B of the array 402 are explicitly shown.

Although FIG. 4 illustrates one row and two columns of memory cells, the array 402 may include a different number (e.g., more, fewer) of rows and/or columns than that shown in FIG. 4. Ellipses between the memory cells 410A and 410B indicate that one or more additional memory cells are present between the memory cells 410A and 410B or no memory cells are present between the memory cells 410A and 410B. Ellipses above the memory cells 410A and 410B indicate that one or more previous rows of memory cells are present or no previous rows of memory cells are present. Ellipses below the memory cells 410A and 410B indicate that one or more subsequent rows of memory cells are present or no subsequent rows of memory cells are present. In some cases, each row of the array 402 may have hundreds or thousands of memory cells. In an embodiment, memory cells of the array 402 may define/configure logic functions, such as logic functions of one or more LUTs (e.g., one or more LUT4s) and/or other components. As such, the memory cells 410A, 410B, and other memory cells not explicitly shown may be referred to as configuration memory cells.

The PLD 400 includes address logic implemented, for example, by the address logic circuit 404 (e.g., also referred to simply as address circuit). In an embodiment, the address circuit 404 may include an address shift register. Additional and/or related logic can be used to implement the address logic. The address circuit 404 may be utilized to selectively assert columns of the array 402 via address lines. For example, the address circuit 404 may assert an address line 412A, via a word line driver 414A of the word line circuit 406, to facilitate access to the memory cell 410A and other memory cells, if any, in the same column as the memory cell 410A. Asserting the address line 412A may be referred to as asserting (e.g., selecting) a configuration memory column that includes the memory cell 410A. Similarly, the address circuit 404 may assert an address line 412B, via a word line driver 414B of the word line circuit 408, to facilitate access to the memory cell 410B and other memory cells, if any, in the same column as the memory cell 410B. In addition, the address circuit 404 may be utilized to selectively assert columns of another programmable logic block (not shown) and/or other memory via additional address lines not shown in FIG. 4. In some embodiments, each row of memory cells has its own repeater circuit 408.

The PLD 400 includes data write logic implemented, for example, by the repeater circuit 408 (e.g., also referred to as a data path repeater circuit, repeater block, or simply repeater). During configuration of the PLD 400 (e.g., as part of an initial configuration after a POR event, a reprogramming event after a reset of the PLD 400, or other event), the data write logic of the repeater circuit 408 may write configuration data into the array 402. The configuration data can be provided as a configuration bitstream that is loaded serially, via data lines, into the array 402, other memory cell arrays (not shown) of the same or different programmable logic blocks, and/or other configuration memory cells. With respect to configuring the array 402, a data line 416 of the repeater circuit 408 may be utilized to receive a portion of the configuration bitstream and provide (e.g., write, store) the received portion to the memory cell 410A and/or other memory cells along the same row that are not explicitly shown in FIG. 4 via bitlines 418 and 420.

The configuration data can be provided from the data line 416 to the bitlines 418 and 420 via an AND gate 422 and a write circuit 424 (e.g., also referred to as a write driver and denoted as WD). In an embodiment, the bitlines 418 and 420 form a complementary pair. In such an embodiment, the write circuit 424 may include differential write drivers to provide respective signals to the differential bitlines. The AND gate 422 may generate a logic high signal (e.g., "1") or a logic low signal (e.g., "0") based on a signal on the data line 416 and a negated power-on reset signal (denoted as por_n). The negated power-on reset signal is complementary to a power-on reset signal (denoted as por and not shown in FIG. 4). The por signal may be at logic high during a POR event (e.g., when the PLD 400 is performing a POR event) and at logic low when a POR event is not occurring. As a complementary signal to the por signal, the por_n signal may be at logic low during a POR event and at logic high when a POR event is not occurring.

In this regard, for the repeater circuit 408, the AND gate 422 generates a logic high signal (e.g., "1") when the signal on the data line 416 is a logic high signal and the por_n signal is a logic high signal (e.g., the PLD 400 is not performing a POR event), and the AND gates 422 generates a logic low signal (e.g., "0") otherwise. The por_n signal may be provided by a power up detector circuit 453 (e.g., also referred to as a POR detector circuit) and transition to a logic high when adequate supply range is acquired for the power supply $V_{CC}$, as further described herein. In some cases, the power up detector circuit may generate the por signal complementary to the por_n signal alternative or in addition to generating the por_n signal and provide the por signal to the AND gate 422. In some embodiments, a single power up detector circuit 453 may be implemented per chip to detect whether an adequate supply range has been acquired for the power voltage supply $V_{CC}$. The power up detector circuit 453 may output the por_n signal and/or the por signal and propagate to all circuitry that uses this result to release resets or power up supplies/supply lines. As previously indicated, each row of configuration memory cells has its own repeater 408, and thus has its own power supply circuit 452.

For example, when the data line 416 has a logic high signal (e.g., "1") intended for the memory cell 410A and the por_n signal is a logic high signal, the AND gate 422 may drive the write circuit 424 via the logic high signal from the AND gate 422 and the write circuit 424 may provide values on the bitlines 418 and 420 indicative of the data line 416 having the logic high signal. In this example, the write circuit 424 may provide a logic high signal on the bitline 418 and a logic low signal on the bitline 420. These signals are stored in the memory cell 410A and are indicative of the memory cell 410A storing a data bit value of 1. Similarly, other data lines may be utilized to provide configuration data to memory cells of other rows that are not explicitly shown in FIG. 4. In an embodiment, the data lines (e.g., 416), AND gates (e.g., 422), write circuits (e.g., 424), and bitlines (e.g., 418, 420) may be considered as forming a configuration path for the PLD 400. The data lines may be referred to as configuration ports of the PLD 400.

The PLD 400 includes data read back logic implemented, for example, by the repeater circuit 408. Additional and/or related logic can be used to implement the data read back logic. For facilitating read back, when a column is asserted by the address circuit 404, the repeater circuit 408 provides a read back value on data lines of memory cells on the asserted column. For example, when the address line 412A is asserted by the address circuit 404, the repeater circuit 408 provides a read back value associated with the memory cell 410A on the data line 416 and read back values associated with other memory cells along the same column on respective data lines (not shown in FIG. 4).

A read operation may be performed to read data bit values stored in any one of the memory cells 410A, 410B, and/or other memory cells not explicitly shown in FIG. 4. For example, to read the memory cell 410B, a sense amplifier 426 receives a signal on each of the bitlines 418 and 420. For example, when the data bit value stored in the memory cell 410B is a 0 (e.g., a logic low), the bitline 418 may be a logic low signal and the bitline 420 may be a logic high signal, or vice versa depending on implementation. The sense amplifier 426 determines the data bit value stored in the memory cell 410B based on the signal on the bitlines 418 and 420 and generates a read back value that indicates the data bit value stored in the memory cell 410B is a 0. The read back value is coupled to the data line 416 to be read out from the PLD 400. An AND gate 428 between the sense amplifier 426 and the data line 416 is configured to provide the same logic value (0 in this example) as that generated by the sense amplifier 426 in the case of the read operation. In some cases, as shown in FIG. 4, the AND gate 428 also receives a negated inhibit signal (denoted as inhibit_n). The inhibit_n signal may be complementary to an inhibit signal (denoted as inhibit). The inhibit signal may be at logic high when the array 402 includes distributed RAM and at logic low when the array 402 does not include distributed RAM. As a complementary signal to the inhibit signal, the inhibit_n signal may be at logic low when the array 402 includes distributed RAM and at logic high when the array 402 does not include distributed RAM. A buffer 430 drives the value provided by the AND gate 428 on the data line 416. In an embodiment, for purposes of a read operation, the bitlines, sense amplifiers (e.g., 426), and buffers (e.g., 430) may be considered as forming a read path for the PLD 400. Similarly, other data lines may be utilized to provide read back values for memory cells of other rows that are not explicitly shown in FIG. 4. In some cases, the rows are read out simultaneously or substantially simultaneously. In some cases, during an erase of the array 402 (e.g., for POR and/or reprogramming purposes), any distributed RAM may be erased along with other configuration memory cells. Examples of a PLD architecture having distributed RAM cells can be found, for example, at U.S. Pat. No. 10,417,078, which is incorporated by reference in its entirety.

In one case, the address circuit 404 includes memory to store information identifying column addresses associated with each configuration memory column, including the configuration memory column that includes the memory cell 410A and the configuration memory column that includes the memory cell 410B. The line 412A, the line 412B, and/or other lines may be asserted (e.g., set to logic high) based on the current column(s) selected/asserted by the address circuit 404.

A pre-charge circuit 440 may be used to facilitate read back. The pre-charge circuit 440 may be driven based on a negated pre-charge signal (denoted as precharge_n). With reference to the data line 416, the pre-charge circuit 440 is formed of transistors 442, 444, and 446 driven by the precharge_n signal. When the transistors 442, 444, and 446 are turned on (e.g., the precharge_n signal is at logic low), the pre-charge circuit 440 drives the bitlines 418 and 420 to a pre-charge state. For example, the pre-charge state may set both the bitlines 418 and 420 to a logic high. Transistors 448 and 450 of the pre-charge circuit 440 may compensate for leakage associated with access devices of memory cells that are not currently being read.

In some embodiments, to facilitate deterministic reset of the PLD 400, configuration memory cells, including the memory cells 410A and 410B, are powered using two power supply lines $V_{CCM}$ and $V_{CCINT}$. In an aspect, the power supply lines $V_{CCM}$ and $V_{CCINT}$ may be referred to as and/or considered to be power supply nodes $V_{CCM}$ and $V_{CCINT}$, power supply sources $V_{CCM}$ and $V_{CCINT}$, power supply signals $V_{CCM}$ and $V_{CCINT}$, power supply voltages $V_{CCM}$ and $V_{CCINT}$, and/or power supplies $V_{CCM}$ and $V_{CCINT}$. A reset may be performed to initialize (e.g., wake up) the configuration memory cells of the PLD 400 to a known reset state (e.g., as a part of a POR event) and/or prior to a reprogramming event in which a programmed PLD has its configuration memory cells erased prior to being reprogrammed with a new bitstream. Each row of the array 402 has an individual $V_{CCM}$ line/signal and $V_{CCINT}$ line/signal used to power the configuration memory cells of the row.

In some aspects, to facilitate the deterministic reset, the repeater circuit 408 controls the $V_{CCM}$ and $V_{CCINT}$ power supply lines in combination with bitline signals on the bitlines 418 and 420. In this regard, the PLD 400 includes circuitry for selectively operating the write circuit 424 and selectively coupling the power supply lines $V_{CCM}$ and $V_{CCINT}$ to the memory cells of the array 402. The circuitry includes an AND gate 432, a NAND gate 434, and a power supply circuit 452. The power supply circuit 452 includes a transistor 436 (e.g., p-type metal-oxide-semiconductor (MOS) transistor), a transistor 437 (e.g., n-type MOS transistor), and a transistor 438 (e.g., p-type MOS transistor). The transistors 436 and 438 are each coupled to a power supply that supplies a power supply voltage $V_{CC}$ to the transistors 436 and 438. It is noted that the power supply coupled to the transistor 436 and supplying the power supply voltage $V_{CC}$ to the transistor 436 may be the same power supply or a different power supply that supplies the power supply voltage $V_{CC}$ to the transistor 438. The transistor 437, the transistor 436 connected to the transistor 437, and the NAND gate 434 are configured to selectively couple the power supply $V_{CC}$ connected to the transistor 434 to the power supply line/node $V_{CCM}$, as further described herein. The transistor 437 has a gate driven by the NAND gate 434, a terminal tied to the $V_{CCM}$ line, and a terminal tied to ground. The transistor 438 has a gate tied to ground.

The AND gate 432 is a three-input AND gate that receives as its input the inhibit_n signal, a configuration write signal (denoted as cram_write), and the por_n signal. The cram_write signal may be at logic high when configuration data is to be or is being written into the array 402 and at logic high when the array 402 is not to be or is not being written into the array 402. As known by one skilled in the art, a bubble/circle represents a negation. A top input of the AND gate 432 that receives the por_n signal is negated. In this regard, the combination of the por_n signal and the negation on the top input of the AND gate 432 is equivalent to a non-negated top input receiving the por signal.

The AND gate 432 generates a logic high signal when the cram_write signal is at logic high (e.g., when configuration data is being written into the array 402), the inhibit_n signal is at logic high, and the por_n signal is at a logic low (e.g., when the PLD 400 is performing a POR operation). Otherwise, the AND gate 432 generates a logic low signal. An output of the AND gate 432 is provided as a control signal to a control port (e.g., denoted by EN) of the write circuit 424 to enable or disable the write circuit 424. In an aspect, the write circuit 424 is enabled when it receives a logic high signal from the AND gate 432, and the write circuit 424 is disabled when it receives a logic low signal from the AND gate 432.

The NAND gate 434 receives as its inputs the por_n signal and a negated sector erase signal (denoted as sector_erase_n). The sector_erase_n signal may be complementary to a sector erase signal (denoted as sector_erase). The sector_erase signal may be at logic high when a sector erase operation is being performed in which a sector of the array 402 is to be or is being erased and at logic low when no sector erase operation is being performed. As a complementary signal to the sector_erase signal, the sector_erase_n signal may be at logic low when a sector erase operation is being performed and at logic high when no sector erase operation is being performed. The sector_erase signal and/or, equivalently, the sector_erase_n signal may be generated in a bitstream controller. The sector_erase signal may be activated/asserted (e.g., at logic high), or equivalently the sector_erase_n signal may be deactivated/deasserted (e.g., at logic low), when a new bitstream is to be loaded into the PLD 400. In this regard, the sector erase operation may be followed by reprogramming of the PLD 400 with the new bitstream. In some implementations, a sector of the PLD 400 is effectively a block of PLD comprised by PLC, EBR, and DSP blocks and may include around a million or so configuration memory cells (e.g., with a thousand or so rows and hundreds of data lines).

The NAND gate 434 generates a logic low signal when the sector_erase_n signal is at logic high (e.g., the PLD 400 is not performing a sector erase operation) and the por_n signal is at logic high (e.g., the PLD 400 is not performing a POR operation). Otherwise, the NAND gate 434 generates a logic high signal. The transistor 436 turns on in response to a logic low signal from the NAND gate 434 and turns off in response to a logic high signal from the NAND gate 434. When the transistor 436 is turned on, the power supply $V_{CC}$ connected to the transistor 436 is coupled to the power supply line/node $V_{CC}$ M. When the transistor 436 is turned off, the power supply $V_{CC}$ connected to the transistor 436 is not coupled to the power supply line/node $V_{CC}$ M. The transistor 437 turns off in response to a logic low signal from the NAND gate 434. The transistor 437 turns on in response to a logic high signal from the NAND gate 434. As such, the transistor 437 couples the $V_{CCM}$ node to ground when the gate of the transistor 437 is high. The transistor 437 couples the $V_{CCM}$ line/node to ground when the transistor 436 is off and not coupling the $V_{CCM}$ line/node to $V_{CC}$.

Figure 5:
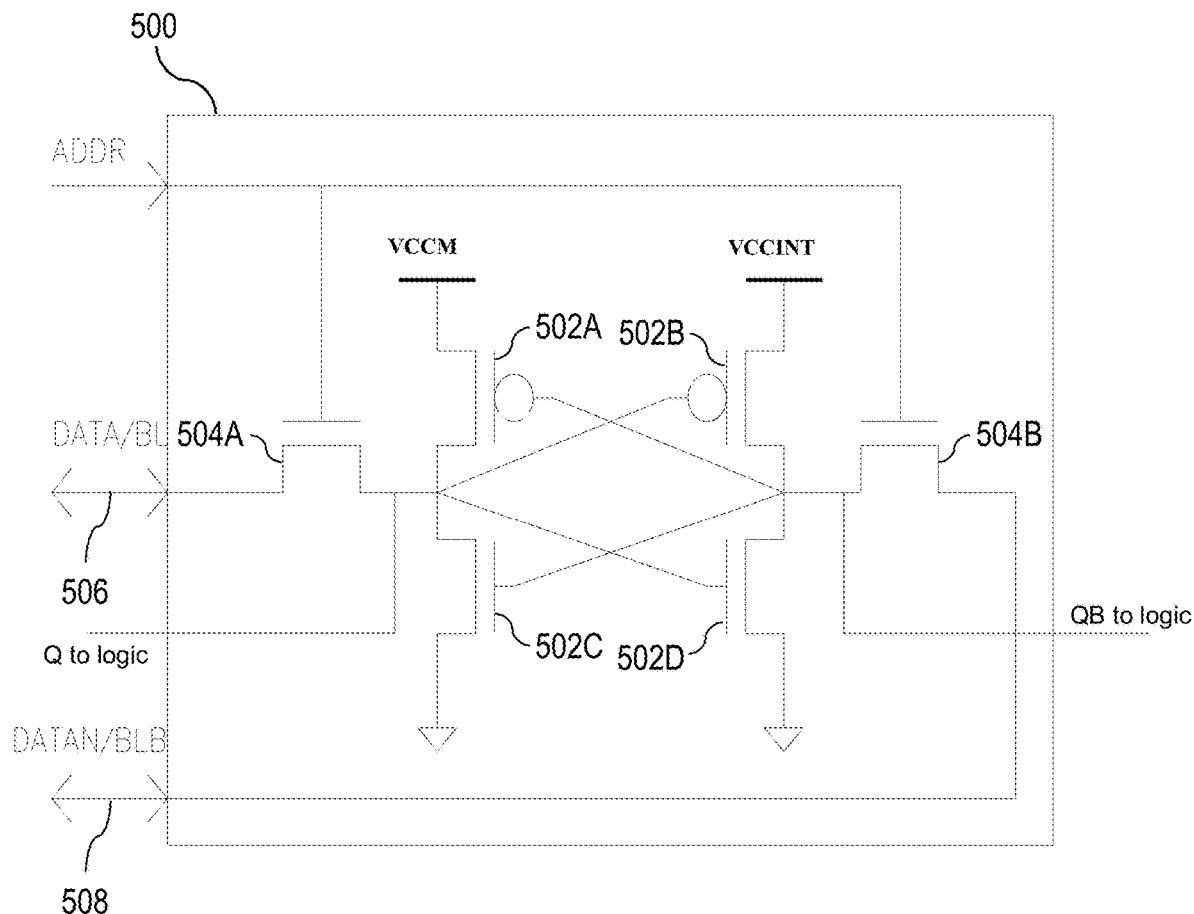
FIG. 5 illustrates an example of a memory cell powered by multiple power supplies in accordance with one or more embodiments of the present disclosure.

FIG. 5 illustrates an example of a memory cell 500 (e.g., a configuration memory cell such as a CRAM cell) in accordance with one or more embodiments of the present disclosure. In an embodiment, the memory cell 500 may be any one of the memory cells 410A or 410B. As shown in FIG. 5, in some embodiments, the memory cell 500 may be implemented as a SRAM formed of cross-coupled transistors 502A-D and access transistors 504A-B. When an address logic circuit (e.g., the address circuit 404) asserts a column of a memory array containing the memory cell 500, the access transistors 504A-B are turned on to allow a data bit value stored using the cross-coupled transistors 502A-D to be provided as complementary signals on bitlines 506 and 508. As shown in FIG. 5, a Q node is adjacent to the transistor 504A and a $Q_B$ node (having a value complementary to the Q node) is adjacent to the transistor 504B. For example, when the memory cell 500 stores a data bit value of 1, a 1 is provided on the bitline 506 and a 0 is provided on the bitline 508. For example, the memory cell 500 may be the memory cell 410A and the bitlines 506 and 508 may be the bitlines 418 and 420, respectively. In an embodiment, the memory cell 500 is powered using different power supply lines. The transistor 502A is coupled to a $V_{CCM}$ level (e.g., provided at a bottom terminal of the transistor 436). The transistor 502B is coupled to a $V_{CCINT}$ level (e.g., provided at a bottom terminal of the transistor 438).

In some embodiments, the repeater circuit 408 may facilitate erasure of all configuration memory cells, including the memory cells 410A and 410B, to a zero state (e.g., also referred to as a reset state) by selectively coupling the power supply $V_{CC}$ to the power supply line $V_{CC}$ M. In an embodiment, a memory cell is in a zero state when the memory cell stores a zero. With reference to FIG. 5, the memory cell 500 stores a signal Q and a signal $Q_B$ that is complementary to the signal Q. In the zero state, Q=0 and QB=1.

During a POR event (e.g., when the por_n signal is at logic low) or a sector erase event (e.g., when the sector_erase signal is at logic high (e.g., active)), all word line drivers (e.g., including the word lines 414A and 414B) and associated word line decoder (e.g., part of the address circuit 404) are activated to set all word lines (e.g., including the word lines 412A and 412B) to an on/asserted state (e.g., a logic high state).

Figure 6:
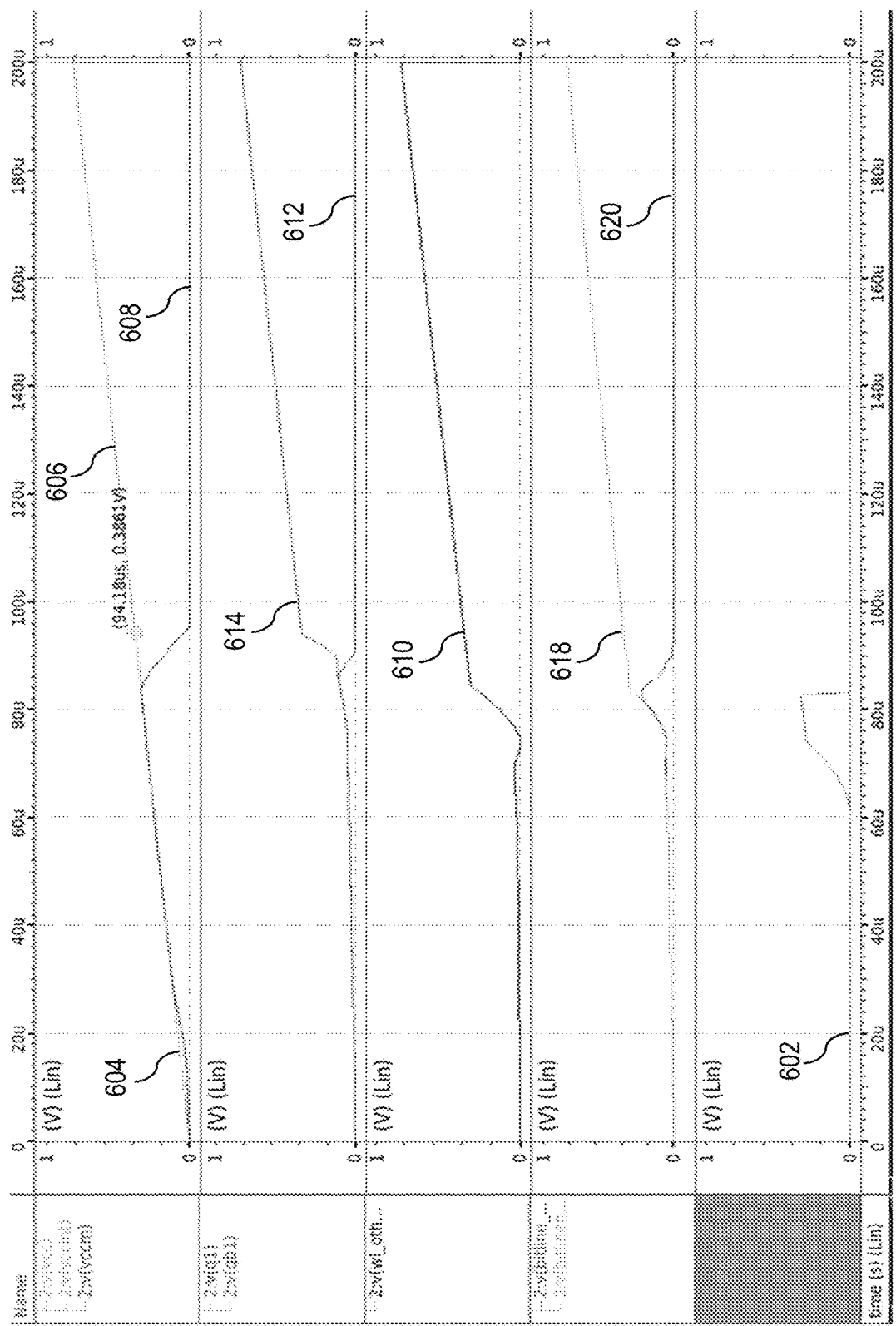
FIG. 6 illustrates voltage diagrams associated with a power-on sequence for configuration memory cells powered by multiple power supplies in accordance with one or more embodiments.

FIG. 6 illustrates voltage diagrams associated with a power-on sequence (e.g., also referred to as a POR sequence) for configuration memory cells powered by multiple power supplies $V_{CCM}$ and $V_{CCINT}$ in accordance with one or more embodiments. The voltage diagrams are provided over linear time (denoted as Lin) as opposed to frequency on the horizontal axis. At around $t=t_1$, the por_n signal (represented by curve 602) may be set to a logic low to initiate a POR event. The por_n signal may be a wakeup signal from a power up detector circuit (e.g., the power up detector circuit 453) that detects supplies (e.g., $V_{CC}$) are high enough to begin operating the PLD 400. Power supply voltages $V_{CC}$, $V_{CCM}$, and $V_{CCINT}$ (represented by curves 604, 606, and 608, respectively) start ramping up towards their desired levels (e.g., 0.8 V for all three voltages).

At around $t=t_2$, the power supply lines $V_{CC}$ and $V_{CCINT}$ continues to ramp up towards their desired levels while the power supply line $V_{CCM}$ is ramped downwards and held at a low power supply voltage $V_{SS}$ (e.g., around 0 V in FIG. 6). At around $t_2$, a thermal voltage $V_t$ associated with various devices (e.g., transistor devices) in the repeater circuit 408, word line drivers and decoders, and so forth is overcome. Word lines (represented by curve 610), including the word lines 414A and 414B, are driven toward a logic high. The power supply line $V_{CCM}$ is ramped downward when the por_n signal at logic low causes the NAND gate 434 to generate a logic high output that causes the transistor 436 to turn off and the transistor 437 to turn on. With the transistor 436 turned off and the transistor 437 turned on, the power supply line $V_{CCM}$ is not coupled to the power supply $V_{CC}$ and the power supply line $V_{CCM}$ is ramped downward via the transistor 437. With the power supply line $V_{CCM}$ held at a low power supply voltage $V_{SS}$, the Q node of the memory cell 500 has its level (represented by curve 612) forced to 0. With the power supply voltage $V_{CCINT}$ ramping high with the power supply $V_{CC}$, the $Q_B$ node of the memory cell 500 has its level (represented by curve 614) forced to 1.

In some aspects, to facilitate instantiation of a 0 for the Q node and a 1 for the $Q_B$ node, the bitline 418 may be driven low (represented by curve 620) by the write circuit 424 and the bitline 420 may be driven high (e.g., to $V_{CC}$) (represented by curve 618) by the write circuit 424. In this regard, with the por_n signal at logic low, an output of the AND gate 422 is at logic low. The write circuit 424 provides a 0 on the bitline 418 and a 1 on the bitline 420 indicative of the logic low received by the write circuit 424 from the AND gate 422.

At around $t_3$, the por_n signal transitions to logic high. In this regard, the power up detector circuit 453 that generates the por_n signal may detect that an adequate supply range has been acquired for the power voltage supply $V_{CC}$. In response to detecting the adequate supply range has been acquired at around $t_3$, the power up detector circuit 453 transitions the por_n signal from logic low to logic high. When the por_n signal transitions to logic high (e.g., referred to as the por_n signal being released), the word lines may all be driven (e.g., returned) to a low level. In this regard, the word lines are deactivated after the power up event. With the por_n signal at logic high and the sector_erase_n at logic high, the NAND gate 434 generates a logic low signal as output and provides the logic low signal to the transistor 436 to turn on the transistor 436 and to the transistor 437 to turn off the transistor 437 to turn off the $V_{CCM}$ coupling to ground. With the transistor 436 turned on, the power voltage supply $V_{CCM}$ is charged (e.g., quickly ramped high) to the power voltage supply $V_{CC}$ such that the memory cells hold the erased state. As an example, in FIG. 6, $t_1=0$, $t_2=80$ μs, $t_3=200$ μs and the power supply voltage $V_{CC}$ (and $V_{CCINT}$ coupled to $V_{CC}$) follow a 200 μs ramp.

After $t_3$, the POR event ends and the memory cells of the array 402 are initialized (e.g., woken up) in a known erased state (e.g., with outputs of Q=0) and does not cause contention in routing multiplexers and other associated logic. The memory cells may then be programmed with a configuration bitstream.

Figure 7:
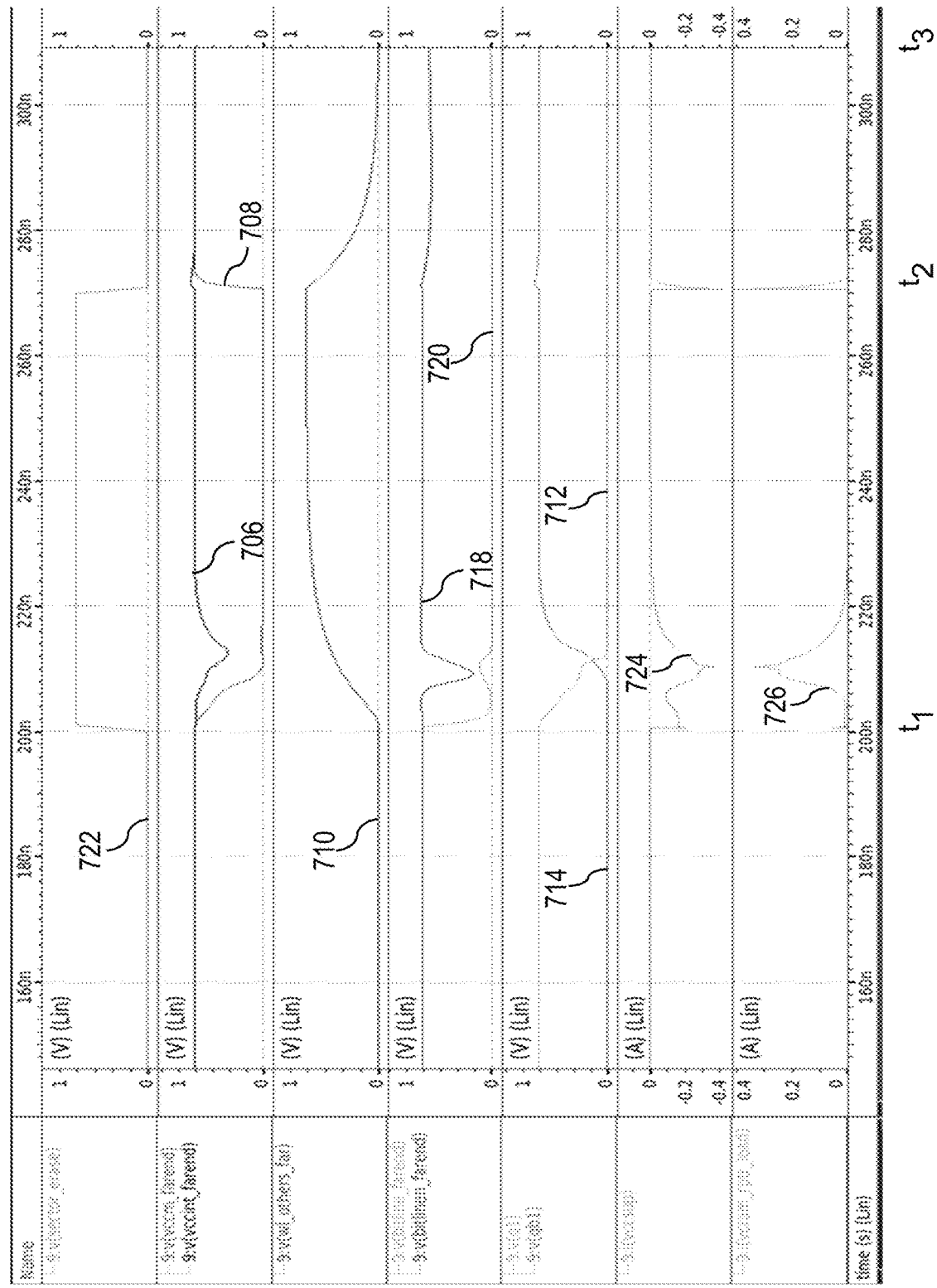
FIG. 7 illustrates voltage diagrams associated with a sector erase on a sector of configuration memory cells that are powered by multiple power supplies in accordance with one or more embodiments.

FIG. 7 illustrates voltage diagrams associated with a sector erase on a sector of configuration memory cells that are powered by multiple power supplies $V_{CCM}$ and $V_{CCINT}$ in accordance with one or more embodiments. The voltage diagrams are provided over linear time (denoted as Lin) on the horizontal axis. The sector erase may be performed prior to reprogramming of the sector of the PLD 400.

Prior to $t_1$, the power supply lines $V_{CCM}$ and $V_{CCINT}$ (represented by curves 706 and 708, respectively) are at their high/charged levels, the word lines for all columns of the PLD 400 are deasserted (represented by curve 710), the Q node of a memory cell (e.g., the memory cell 500) having a level at logic high (represented by 712), the $Q_B$ node of the memory cell having a level at logic low (represented by curve 714), the bitline 418 having a level at logic high (represented by curve 718), the bitline 420 having a level at logic high (represented by curve 720), and the por_n signal having a level at logic high (e.g., indicative of the PLD 400 not performing a POR operation). It is noted that a postfix farend in FIG. 7 denotes a signal at its farthest point from the repeater circuit 408. It is noted that the pre-charge circuit 440 may have charged the bitline 418 to logic high (represented by curve 718) and the bitline 420 to logic high (represented by curve 720). This charging of the bitlines 418 and/or 420 is implementation dependent and unassociated with operation after around $t_1$. Curves 724 and 726 provide currents that are an accumulated total for an entire sector's worth of configuration memory cells (e.g., around a million configuration memory cells in some implementations) as well as associated currents in all repeater circuits inside that sector. In some implementations, the currents are monitored to ensure that they are below 500 mA to avoid having too much current flow inside the PLD 400.

At around $t=t_1$, the sector_erase signal (represented by curve 722) may be set to logic high to initiate a sector erase event or, equivalently, the complementary signal sector_erase_n signal is set to a logic low. With reference to FIG. 4, the NAND gate 434 generates a logic high output in response to the sector_erase_n signal being at logic low, thus turning off the transistor 436. With the transistor 436 turned off and the transistor 437 turned on, the power supply line $V_{CCM}$ is driven low (e.g., pulled low) via the transistor 437. The transistor 438 is continuously tied to ground and remains on. It is noted that the transistor 438 may be optional and the power supply $V_{CC}$ may be directly connected to the power supply line $V_{CCINT}$ (e.g., with $V_{CC}$ directly driving $V_{CCINT}$). In some implementations, the transistor 438 may allow a faster transition for the power supply line $V_{CCINT}$ relative to a case without the transistor 438. Such a faster transition for the power supply line $V_{CCINT}$ may be associated with a faster accomplishment of a sector erase. In this regard, a dip in the curve 706 after $t_1$ due to an impedance of the transistor 438 may speed up transition at an output of the transistor 438. In some cases, the transistor 438 may allow for the faster transition while lowering current peaks. In this regard, without the transistor 438, the current peaks associated with the curves 724 and/or 726 may be higher than those shown in FIG. 7.

Between around $t_1$ and around $t_2$, the sector_erase signal is maintained at logic high. The power supply line $V_{CCM}$ is driven low via the transistor 437. With the power supply line $V_{CCM}$ driven low, the Q node of the memory cell is driven low. With the power supply line $V_{CCINT}$ substantially maintained, the $Q_B$ node of the memory cell is driven high. The bitline 418 is driven down to logic low. The bitline 420 is maintained at logic high. The word lines are driven high. In some cases, the word lines may be activated (e.g., driven high) after the power supply line $V_{CCM}$ is driven low, the bitline 418 driven low, and the bitline 420 driven high. With the Q node at logic low and $Q_B$ node at logic high, the memory cell is in a reset state.

At around $t_2$, the sector_erase signal is driven to a logic low. With reference to FIG. 4, the NAND gate 434 generates a logic low output in response to the sector_erase_n signal being at logic high and the por_n signal being maintained at logic high, thus turning on the transistor 436 and turning off the transistor 437.

Between $t_2$ and $t_3$, with the transistor 436 turned on, the power supply line $V_{CCM}$ is driven high (e.g., pulled high). The word lines are deasserted. The power supply line $V_{CCINT}$ remains high. The bitline 418 is maintained at logic low. The bitline 420 is maintained at logic high. The Q node is maintained at logic low and $Q_B$ node is maintained at logic high. In this regard, the memory cell is maintained in the reset state (e.g., for subsequent configuration). After around $t_3$, the various voltages and logic levels are maintained until the memory cell is taken out of the reset state (e.g., when reprogrammed). In some cases, the duration between $t_1$ and $t_2$ may be referred to as a duration of the sector erase. In other cases, the duration between $t_1$ and $t_3$ may be referred to as a duration of the sector erase.

Figure 8:
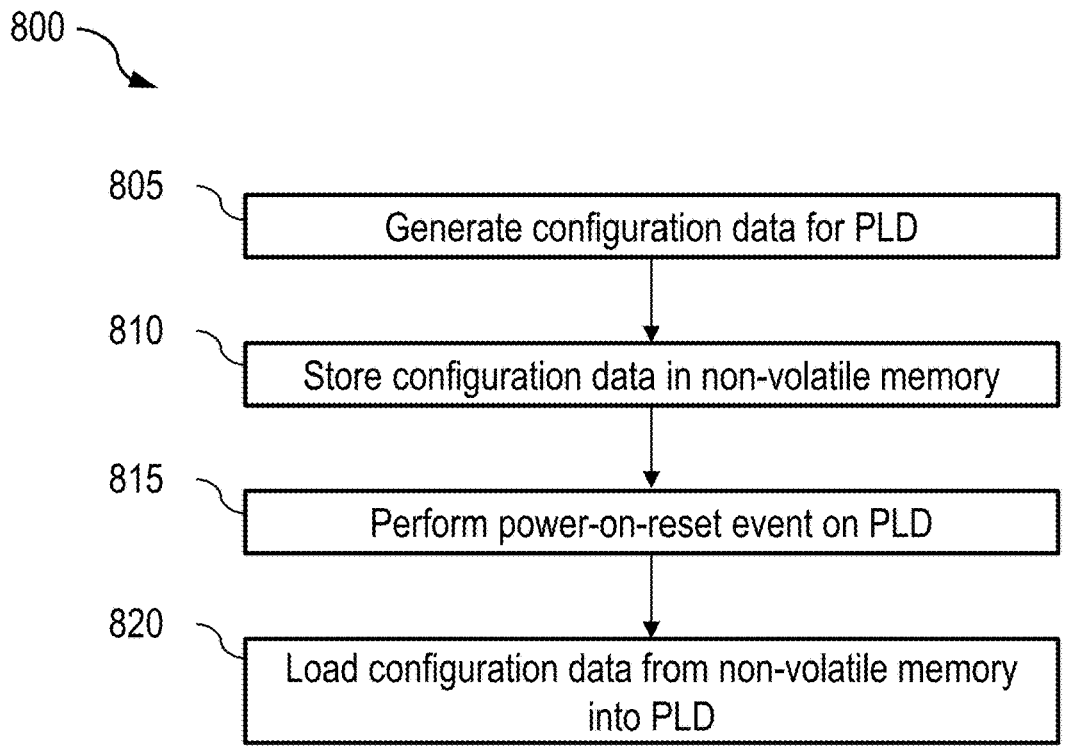
FIG. 8 illustrates a flow diagram of an example process for configuring a PLD in accordance with one or more embodiments of the present disclosure.

FIG. 8 illustrates a flow diagram of an example process 800 for configuring a PLD (e.g., the PLD 400) in accordance with one or more embodiments of the present disclosure. Although, for explanatory purposes, the process 800 is described with reference to systems, devices, processes, and elements of FIGS. 1 and 4, the process 800 may be performed by other systems, devices, and elements, and including a different selection of electronic systems, devices, elements, assemblies, and/or arrangements. At the initiation of the process, various system parameters may be populated by prior execution of a process similar to the process, for example, or may be initialized to zero and/or one or more values corresponding to typical, stored, and/or learned values derived from past operation of the process. Note that one or more operations may be combined, omitted, and/or performed in a different order as desired.

At block 805, configuration data is generated. For example, the configuration data may be generated by the external system 130 based on a desired user configuration/design of the PLD 400. At block 810, the generated configuration data is stored in non-volatile memory (e.g., flash memory). The non-volatile memory may be in the PLD 400 and/or external to the PLD 400 (e.g., external hard drive, external flash drive). At block 815, a POR event is performed on the PLD 400. An example of a POR event is described with respect to FIG. 10. At block 815, the configuration data is loaded from the non-volatile memory into volatile memory of the PLD 400. The configuration data may be provided as a configuration bitstream onto bitlines to be written in corresponding configuration memory cells (e.g., configuration SRAM cells).

Figure 9:
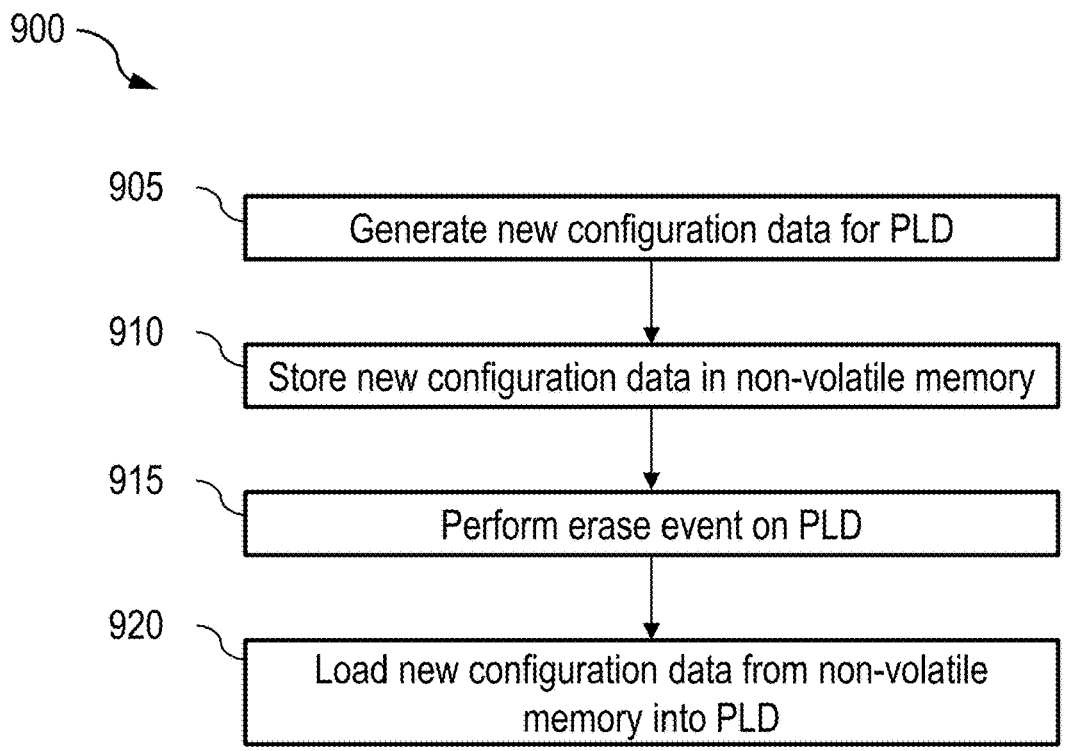
FIG. 9 illustrates a flow diagram of an example process for reprogramming a PLD in accordance with one or more embodiments of the present disclosure.

FIG. 9 illustrates a flow diagram of an example process 900 for reprogramming a PLD (e.g., the PLD 400) in accordance with one or more embodiments of the present disclosure. Although, for explanatory purposes, the process 900 is described with reference to systems, devices, processes, and elements of FIGS. 1 and 4, the process 900 may be performed by other systems, devices, and elements, and including a different selection of electronic systems, devices, elements, assemblies, and/or arrangements. At the initiation of the process, various system parameters may be populated by prior execution of a process similar to the process, for example, or may be initialized to zero and/or one or more values corresponding to typical, stored, and/or learned values derived from past operation of the process. Note that one or more operations may be combined, omitted, and/or performed in a different order as desired. In an embodiment, at least blocks 915 and 920 are performed after the process 800.

At block 905, new configuration data is generated. For example, the new configuration data may be generated by the external system 130 based on an updated desired user configuration/design of the PLD 400. At block 910, the generated configuration data is stored in non-volatile memory (e.g., flash memory). The non-volatile memory may be in the PLD 400 and/or external to the PLD 400 (e.g., external hard drive, external flash drive). At block 915, an erase event (e.g., a sector erase event) is performed on the PLD 400. An example of an erase event is described with respect to FIG. 11. At block 920, the new configuration data is loaded from the non-volatile memory into volatile memory of the PLD 400. The new configuration data may be provided as a configuration bitstream onto bitlines to be written in corresponding configuration memory cells (e.g., configuration SRAM cells).

Figure 10:
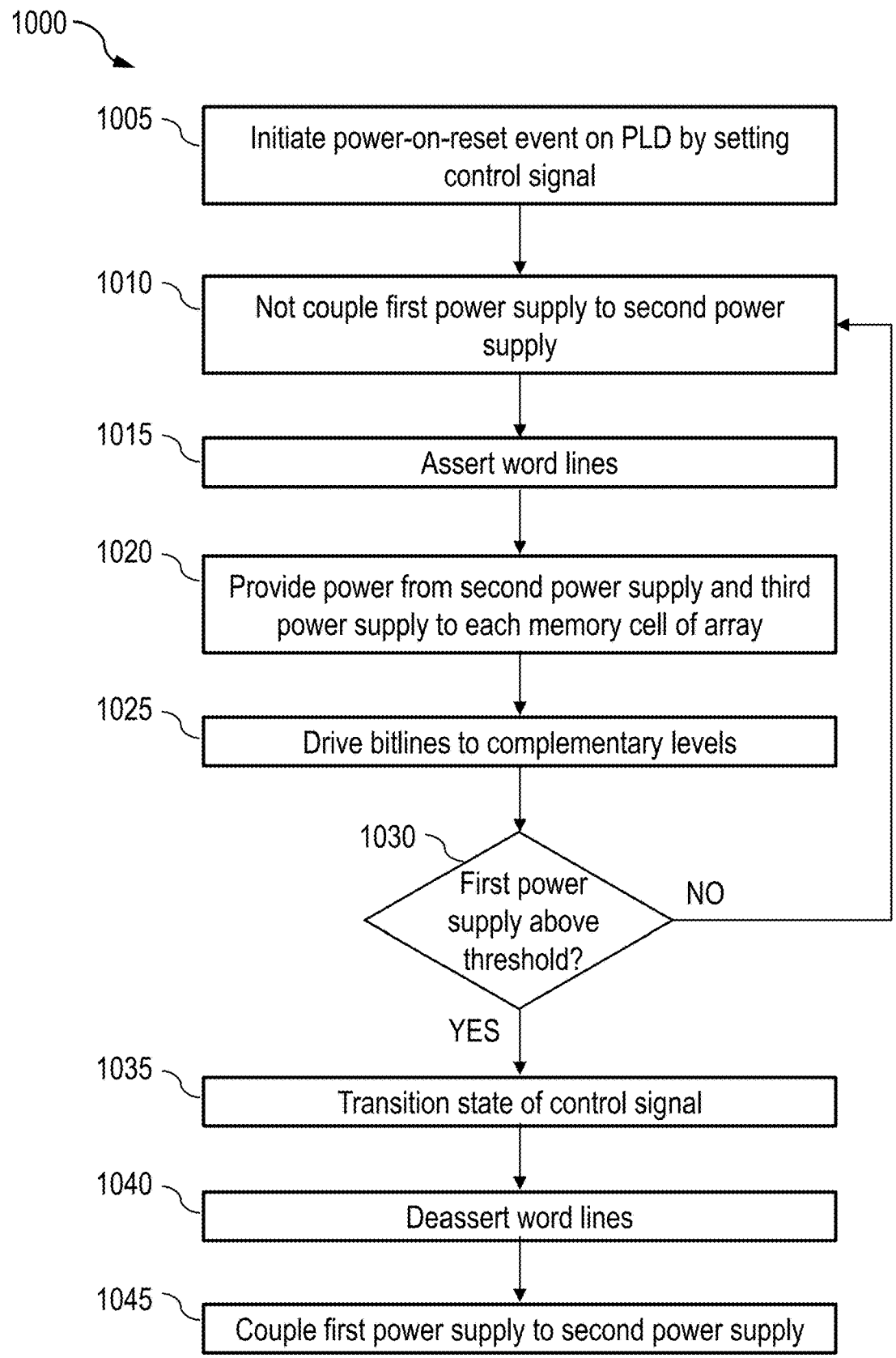
FIG. 10 illustrates a flow diagram of an example process for facilitating deterministic reset of memory cells of a PLD during a power-on event in accordance with one or more embodiments of the present disclosure.

FIG. 10 illustrates a flow diagram of an example process 1000 for facilitating deterministic reset of memory cells of a PLD (e.g., the PLD 400) during a POR event in accordance with one or more embodiments of the present disclosure. Although, for explanatory purposes, the process 1000 is described with reference to systems, devices, processes, and elements of FIGS. 1 and 4, the process 1000 may be performed by other systems, devices, and elements, and including a different selection of electronic systems, devices, elements, assemblies, and/or arrangements. At the initiation of the process, various system parameters may be populated by prior execution of a process similar to the process, for example, or may be initialized to zero and/or one or more values corresponding to typical, stored, and/or learned values derived from past operation of the process. Note that one or more operations may be combined, omitted, and/or performed in a different order as desired. In an embodiment, block 815 may be, may include, or may be a part of, the process 1000.

At block 1005, a power up detector circuit initiates a POR event on the PLD 400. The power up detector circuit may initiate a POR event by setting the por_n signal to a logic low state. During the POR event, the power supply $V_{CC}$ ramps up to its charged level. The power supply lines $V_{CCM}$ and $V_{CCINT}$ change in value according to operation of the power supply circuit 452 formed of the transistors 436, 437, and 438. At block 1010, the transistor 436 of the power supply circuit 452 does not couple the power supply $V_{CC}$ to the power supply line $V_{CC}$ M. In this regard, with the por_n signal at a logic low, the NAND gate 434 generates a logic high signal and turns off the transistor 436, thus decoupling the power supply $V_{CC}$ from the power supply line $V_{CC}$ M. In addition, the transistor 437 is turned on and couples the power supply line $V_{CCM}$ to ground via the NAND gate 434 output. At block 1015, the word lines (e.g., including the word lines 412A and 412B) are asserted (e.g., in response to the por_n signal being at a logic low state). In some cases, all the word lines associated with the array 402 are asserted. At block 1020, the power supply circuit 452 provides the power supply line $V_{CCM}$ and the power supply $V_{CCINT}$ to the memory cells of the array 402. At block 1025, the write circuit 424 drives the bitlines 418 and 420 to complementary levels in response to the por_n signal being at a logic low, which causes the AND gate 432 to generate a logic high to enable the write circuit 424 and the AND gate 422 to output a logic low signal for driving the bitlines 418 and 420.

At block 1030, the power up detector circuit determines whether the power supply $V_{CC}$ has reached a threshold level.

If the determination at block 1030 is that the power supply $V_{CC}$ has not reached the threshold level, the process 1000 returns to block 1010. If the determination at block 1030 is that the power supply $V_{CC}$ has reached the threshold level, the process 1000 proceeds to block 1035. In some cases, the threshold level may be a desired level (e.g., normal operation level) of the power supply $V_{CC}$. Upon reaching block 1035, the memory cells have been set to a reset state (e.g., Q node=0, $Q_B$ node=1). At block 1035, the power up detector circuit 453 transitions the state of the por_n signal to a logic high state. At block 1040, the word lines are deasserted (e.g., in response to the por_n signal being in the logic high state). At block 1045, the transistor 436 of the power supply circuit 452 couples the power supply $V_{CC}$ (which has ramped to at least the threshold level) to the power supply $V_{CCM}$ in response to the por_n signal being in the logic high state. In this regard, with the por_n signal at a logic high and the sector_erase_n signal at a logic high (e.g., since there is no sector erase event), the NAND gate 434 generates a logic low signal and turns on the transistor 436, thus coupling the power supply $V_{CC}$ from the power supply $V_{CCM}$, and turns off the transistor 437, which was coupling the power supply line $V_{CCM}$ to ground. The power supply circuit 452 continues to provide the power supply line $V_{CCM}$ (now coupled to the power supply $V_{CC}$) and the power supply $V_{CCINT}$ line to the memory cells of the array 402 to maintain the reset/erased state of the memory cells. After block 1045, block 820 of the process 800 may be performed to load the configuration data into the memory cells, which are in the reset state.

Figure 11:
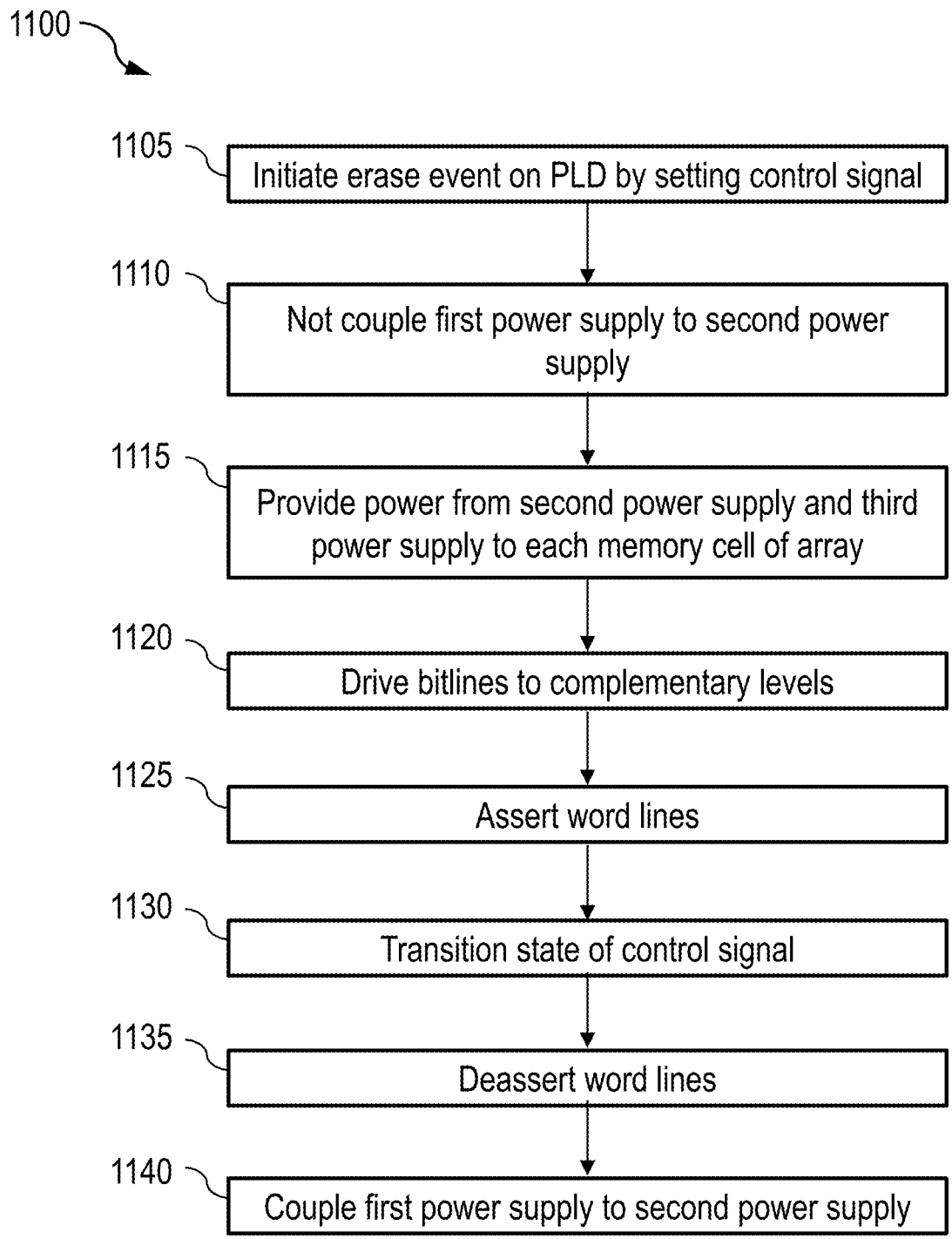
FIG. 11 illustrates a flow diagram of an example process for facilitating deterministic reset of memory cells of a PLD during an erase event in accordance with one or more embodiments of the present disclosure.

FIG. 11 illustrates a flow diagram of an example process 1100 for facilitating deterministic reset of memory cells of a PLD (e.g., the PLD 400) during an erase event (e.g., a sector erase event) in accordance with one or more embodiments of the present disclosure. Although, for explanatory purposes, the process 1100 is described with reference to systems, devices, processes, and elements of FIGS. 1 and 4, the process 1100 may be performed by other systems, devices, and elements, and including a different selection of electronic systems, devices, elements, assemblies, and/or arrangements. At the initiation of the process, various system parameters may be populated by prior execution of a process similar to the process, for example, or may be initialized to zero and/or one or more values corresponding to typical, stored, and/or learned values derived from past operation of the process. Note that one or more operations may be combined, omitted, and/or performed in a different order as desired. In an embodiment, block 915 may be, may include, or may be a part of, the process 1100.

At block 1105, a bitstream controller initiates an erase event on the PLD 400. The bitstream controller may initiate an erase event by setting the sector_erase_n signal to a logic low state. At block 1110, the transistor 436 of the power supply circuit 452 does not couple the power supply $V_{CC}$ to the power supply line $V_{CC}$ M. In this regard, with the sector_erase_n signal at a logic low, the NAND gate 434 generates a logic high signal and turns off the transistor 436, thus decoupling the power supply $V_{CC}$ from the power supply line $V_{CC}$ M. This signal from the NAND gate 434 also turns on the transistor 437, thus coupling the power supply line $V_{CCM}$ to ground. At block 1115, the power supply circuit 452 provides the power supply $V_{CCM}$ and the power supply line $V_{CCINT}$ to the memory cells of the array 402. At block 1120, the write circuit 424 drives the bitlines 418 and 420 to complementary levels. At block 1125, the word lines (e.g., including the word lines 412A and 412B) are asserted (e.g., in response to the sector_erase_n signal being at a logic low state). In some cases, all the word lines associated with the array 402 are all asserted. At block 1130, the bitstream controller transitions the state of the sector_erase_n signal. In some cases, the erase event associated with the sector_erase_n signal may be designed to occur within a predetermined time period (e.g., around 70 ns in FIG. 7). It is noted there is logic (not shown in FIG. 4) that is in the por_n signal path that actuates the por_n signal in sector erase.

Upon reaching block 1135, the memory cells have been set to a reset state (e.g., Q node=0, $Q_B$ node=1). At block 1135, the word lines are deasserted (e.g., in response to the sector_erase_n signal transitioning). At block 1140, the transistor 436 of the power supply circuit 452 couples the power supply $V_{CC}$ to the power supply line $V_{CCM}$ in response to the sector_erase_n signal transitioning and the transistor 437 of the power supply circuit 452, which was coupling the power supply line $V_{CCM}$ to ground, turns off. In this regard, with the por_n signal at a logic high and the sector_erase_n signal at a logic high, the NAND gate 434 generates a logic low signal and turns on the transistor 436, thus coupling the power supply $V_{CC}$ from the power supply line $V_{CC}$ M. The power supply circuit 452 continues to provide the power supply line $V_{CCM}$ (now coupled to the power supply $V_{CC}$) and the power supply line $V_{CCINT}$ to the memory cells of the array 402 to maintain the reset/erased state of the memory cells. After block 1140, block 920 of the process 900 may be performed to load new configuration data into the memory cells, which are in the reset state, to reprogram the PLD 400.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A programmable logic device (PLD) comprising:
   a configuration memory comprising an array of memory cells arranged in rows and columns; and
   a power supply circuit coupled to the configuration memory and configured to:

selectively couple, based on a reset control signal, a first power supply to a first power supply line coupled to the array of memory cells, wherein the array of memory cells is reset if the first power supply is coupled to the first power supply line; and
provide power on a second power supply line to the array of memory cells.

2. The PLD of claim 1, wherein each of the memory cells comprises a first inverter and a second inverter cross-coupled to the first inverter, and wherein the first inverter is connected to the first power supply line and the second inverter is connected to the second power supply line.

3. The PLD of claim 1, further comprising an address logic circuit configured to selectively assert the columns of the array by respective address lines, wherein:
the reset control signal is associated with a power-on-reset (POR) event and is set to a first state during the POR event, and
during the POR event:
the address logic circuit is configured to assert all the columns of the array; and
the power supply circuit is configured to not couple the first power supply to the first power supply line when the control signal is in the first state and provide power on the first and second power supply lines to each of the memory cells such that each of the memory cells is set to a reset state upon completion of the POR event.

4. The PLD of claim 3, further comprising a power up detector circuit configured to determine whether the first power supply has a voltage level above a threshold and set the reset control signal to a second state in response to determining the voltage level of the first power supply is above the threshold, wherein the power supply circuit is configured to couple the first power supply to the first power supply line when the reset control signal is in the second state to maintain the memory cells in the reset state.

5. The PLD of claim 3, further comprising a write circuit configured to write data to the memory cells, wherein, during the POR event, the write circuit is configured to drive, based on the reset control signal, a first bitline to a first state and a second bitline to a second state complementary to the first state.

6. The PLD of claim 3, wherein the configuration memory is configured to store, after the POR event, first configuration data in the memory cells to configure the PLD for operation.

7. The PLD of claim 6, wherein the configuration memory is configured to be erased during an erase event after storing the first configuration data, and wherein during the erase event:
the power supply circuit is configured to not couple the first power supply to the first power supply line and to provide power on the first and second power supply lines to each of the memory cells such that each of the memory cells is set to the reset state upon completion of the erase event; and
the address logic circuit is configured to assert all the columns of the array.

8. The PLD of claim 7, wherein the configuration memory is configured to store, after the erase event, second configuration data in at least a subset of the memory cells.

9. The PLD of claim 1, further comprising an address logic circuit configured to selectively assert the columns of the array by respective address lines, wherein:
the reset control signal is associated with an erase event and is set to a first state during the erase event, and
during the erase event:
the power supply circuit is configured to not couple the first power supply to the first power supply line when the control signal is in the first state and to provide power on the first and second power supply lines to each of the memory cells such that each of the memory cells is set to a reset state upon completion of the erase event; and
the address logic circuit is configured to assert all the columns of the array.

10. The PLD of claim 1, wherein the power supply circuit comprises a first switch connected to the first power supply and the first power supply line and configured to selectively couple the first power supply to the first power supply line.

11. The PLD of claim 1, further comprising a transistor having a gate connected to ground, wherein the transistor is configured to couple the first power supply or a second power supply to the second power supply line.

12. The PLD of claim 1, wherein the reset control signal is associated with a power-on-reset (POR) event or a sector erase event, wherein all the memory cells of the array are configured to be set to a reset state during the POR event, wherein at least a subset of the memory cells of the array are configured to be set to the reset state during the sector erase event, and wherein the first power supply line and the second power supply line have the same logic high voltage and the same logic low voltage.

13. A method comprising:
selectively coupling, by a power supply circuit based on a reset control signal, a first power supply to a first power supply line coupled to an array of memory cells, wherein the power supply circuit is coupled to a configuration memory comprising the array of memory cells arranged in rows and columns, and wherein the array of memory cells is reset if the first power supply is coupled to the first power supply line; and
providing, by the power supply circuit, power on a second power supply line to the array of memory cells.

14. The method of claim 13, wherein each of the memory cells comprises a first inverter and a second inverter cross-coupled to the first inverter, and wherein the first inverter is connected to the first power supply line and the second inverter is connected to the second power supply line.

15. The method of claim 13, wherein the reset control signal is associated with a power-on-reset (POR) event and is set to a first state during the POR event, the method further comprising during the POR event:
asserting, by an address logic circuit, all the columns of the array; and
providing, by the power supply circuit, power on the first and second power supply lines to each of the memory cells and not coupling, by the power supply circuit, the first power supply to the first power supply line when the control signal is in the first state such that each of the memory cells is set to a reset state upon completion of the POR event.

16. The method of claim 15, further comprising:
determining whether the first power supply has a voltage level above a threshold;
setting the reset control signal to a second state in response to determining the voltage level of the first power supply is above the threshold; and
coupling, by the power supply circuit, the first power supply to the first power supply line when the reset control signal is in the second state to maintain the memory cells in the reset state.

17. The method of claim 15, further comprising, during the POR event, driving, by a write circuit based on the reset control signal, a first bitline to a first state and a second bitline to a second state complementary to the first state, wherein the first power supply line and the second power supply line have the same logic high voltage and the same logic low voltage.

18. The method of claim 15, further comprising after the POR event:
 storing first configuration data in the memory cells to configure the PLD for operation;
 performing an erase event after the storing, wherein the erase event comprises providing, by the power supply circuit, power on the first and second power supply lines to each of the memory cells and not coupling, by the power supply circuit, the first power supply to the first power supply line during the erase event such that each of the memory cells is set to a reset state upon completion of the erase event; and
 storing second configuration data in at least a subset of the memory cells.

19. The method of claim 13, wherein the reset control signal is associated with an erase event and is set to a first state during the erase event, the method further comprising during the erase event:
 providing, by the power supply circuit, power from the first and second power supply lines to each of the memory cells and not coupling, by the power supply circuit, the first power supply to the first power supply line when the reset control signal is in the first state such that each of the memory cells is set to a reset state upon completion of the erase event; and
 asserting, by an address logic circuit, all the columns of the array.

20. The method of claim 13, wherein the power supply circuit comprises a switch connected to the first power supply and the first power supply line, and wherein the selectively coupling comprises selectively coupling, by the switch based on the reset control signal, the first power supply to the first power supply line.

\* \* \* \* \*